United States Patent [19]

Yoshida

[11] Patent Number: 4,896,279

[45] Date of Patent: Jan. 23, 1990

[54] METHOD AND AN APPARATUS FOR INSPECTING AN EXTERNAL SHAPE OF AN OBJECT HAVING A SYMMETRY

[75] Inventor: Hajime Yoshida, Tokyo, Japan

[73] Assignee: Hajime Industries Ltd., Tokyo, Japan

[21] Appl. No.: 923,126

[22] Filed: Oct. 24, 1986

[30] Foreign Application Priority Data

Oct. 31, 1985 [JP] Japan ................................ 60-244583

[51] Int. Cl.$^4$ ........................ H04N 7/18; G06K 9/48
[52] U.S. Cl. .................................. 364/559; 364/552; 382/18; 382/25; 358/106; 356/240; 250/223 B
[58] Field of Search ............... 364/559, 560, 564, 552, 364/478; 382/18, 25, 28; 250/203 CT, 223 B; 358/125, 106; 356/240

[56] References Cited

U.S. PATENT DOCUMENTS

| | | | |
|---|---|---|---|
| 4,004,083 | 1/1977 | Norem | 250/203 CT |
| 4,017,721 | 4/1977 | Michaud | 364/513 |
| 4,146,874 | 3/1979 | Ide et al. | 382/56 |
| 4,183,013 | 1/1980 | Agrawala et al. | 382/22 |
| 4,361,830 | 11/1982 | Honma et al. | 382/25 |
| 4,495,585 | 1/1985 | Buckley | 364/487 |
| 4,644,583 | 2/1987 | Watanabe et al. | 382/22 |
| 4,644,584 | 2/1987 | Nagashima et al. | 382/34 |
| 4,682,220 | 7/1987 | Beurskens | 358/106 |

Primary Examiner—P. S. Lall
Assistant Examiner—Ellis B. Ramirez
Attorney, Agent, or Firm—Bauer & Schaffer

[57] ABSTRACT

An object is sensed by a photoelectric conversion sensor having a photoelectric conversion screen expressed as an XY coordinate grid such that the symmetrical axis of the object is parallel to one axis of the XY coordinate, coordinates at a plurality of right left points which respect to the other axis of the XY coordinate at which an external contour of the object intersects a plurality of straight lines perpendicular to the symmetrical axis are determined. Coordinates at a plurality of center points between the right and left points with respect to the other axis are determined, and the maximum frequency coordinate among the coordinates of center points in designated as a standard center coordinate, and the standard center coordinate is compared with each of the plurality of center coordinates.

10 Claims, 4 Drawing Sheets

METHOD AND AN APPARATUS FOR INSPECTING AN EXTERNAL SHAPE OF AN OBJECT HAVING A SYMMETRY

BACKGROUND OF THE INVENTION

1. Field of the Invention

The present invention relates generally to a method and apparatus for inspecting the external appearance of objects and, more specifically, to the method and apparatus therefor using a photoelectrical conversion sensor such as a video camera or the like and electronic processors.

2. Description of the Prior Art

In addition to the functional inspection of objects, the inspection of external appearance is very important in the production of the object. External appearance inspections are made for a variety of reasons such as surface inspection, checking for flaws in the surface of the object or for colour irregularities thereof, or for external shape that detect the defects of an object in its external shape.

Normally, in the apparatus for inspecting the external appearance of an object light from a light source illuminates the inspected object, and the reflected light from the object is picked up by a photoelectric conversion sensor such as a video camera in which the optical image of the object is converted into an electrical signal, and this electrical signal is processed by an electronic processor that possesses a specific logic circuitry to thereby judge the good or bad of the object. There are variations of such methods. One of them is a so-called image diffraction method in which, for instance, when the roundness of a circle is to be measured, the center point of the circle is detected, and the distances from such circle center point to respective points on the external periphery of the circle. In other words, the radiuses of the circle at respective points are measured in order to confirm the roundness of the circle. When the external appearance of other shaped objects is inspected, for example, the center of gravity of the object is detected, and the distances from the center of gravity to respective points on the external portion of the object are measured, and the measured distances are compared with a standard value. Otherwise, there is a so-called pattern matching method in which the pattern of an inspected object is compared with the basic pattern (or standard pattern) of the object to thereby judge the good or bad of the inspected object from such differences.

The above described typical methods of the conventional art have the following problems. At first, there is the problem relating to the generality or flexibility of applications thereof. In other words, when the shape of the inspected object is changed or when the items of inspection, or rather the portion or surface to be measured is changed, it is necessary to change the computer software program in the above-mentioned image diffraction method. Otherwise, in anticipation of such change, although such change is backed up on the computer software and an instruction for such change may be given from a keyboard, the processing that accompanies such change becomes complex, and a special type of operator training becomes necessary.

Further, even in the second example, i.e., pattern matching method, processing to change the basic or standard pattern is required as in the case of the image diffraction method. Also, there is the problem of the processing time. Normally, since most requirements for inspection apparatuses are for on line use at real production lines, it is necessary to inspect objects that flow at a speed of more than several hundred pieces per minute, on a conveyor. Thus, there is a limited processing time made available to inspect one inspected object.

Now then, in order to solve the first problem as mentioned above, in other words, in order to increase the flexibility of adaptation, a highly precise software is required, causing the program length thereof to increase, resulting in an increase in the processing time. This counteracts against solving the second problem.

OBJECTS AND SUMMARY OF THE INVENTION

It is an object of the present invention to provide an improved method and apparatus for inspecting the external appearance of objects.

It is another object of the present invention to provide an method and an apparatus for inspecting the external appearance of objects which are free from the defects encountered in the prior art.

It is a further object of the present invention to provide a method and an apparatus for inspecting the external appearance of objects which uses a photoelectric conversion sensor and an electronic processor.

According to an aspect of the present invention, a method for inspecting the external shape of a symmetrical object a symmetry is provided, comprising the steps of:

(a) providing a photoelectric conversion sensor with a coordinate screen having XY axes;

(b) photosensing said object by said photoelectric conversion sensor such that a symmetrical axis of said object is parallel to one axis of the XY coordinate;

(c) obtaining, on the basis of the video signal from said photoelectric conversion sensor, coordinates at a plurality of right and left points with respect to the other axis of the XY coordinate at which an external contour of said inspected object intersects a plurality of straight lines perpendicular to said symmetrical axis;

(d) obtaining coordinates at each of the center points between said right and left points with respect to each of the straight lines;

(e) obtaining a maximum frequency coordinate among said coordinates of center points between said plurality of right and left points;

(f) designating said maximum frequency coordinate as a standard center coordinate; and (g) comparing the said standard center coordinate with each of said plurality of center coordinates between said plurality of right and left points.

According to another aspect of the present invention, there is a proposed apparatus for inspecting an external shape of an object having a symmetry, comprising:

(a) means for picking-up said object and producing a video signal thereof; and (b) means for processing said video signal; said pick-up means having a photoelectric conversion screen, said photoelectric conversion screen being expressed in an XY coordinate, said pick-up means picking up said object such that a symmetrical axis of said object is parallel to one axis of the XY coordinate, said video signal processing means having;

(A) first means for obtaining, on the basis of the video signal from said pick-up means, coordinates at a plurality of right and left points with respect to the other axis of the XY coordinate at which an external contour of said object intersects a plurality of straight lines perpendicular to said symmetrical axis;

(B) second means for obtaining coordinates at a plurality of center points between said right and left points with respect to said other axis;

(C) third means for obtaining a maximum frequency coordinate among said coordinates of center points between said plurality of right and left points and for designating said maximum frequency coordinate as a standard center coordinate; and (D) fourth means for comparing said standard center coordinate with each of said plurality of center coordinates between said plurality of right and left points to thereby judge good or bad of said object.

These and other objects, features and advantages of the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

The present invention will be explained hereunder in reference with the attached drawings.

Figure 1:
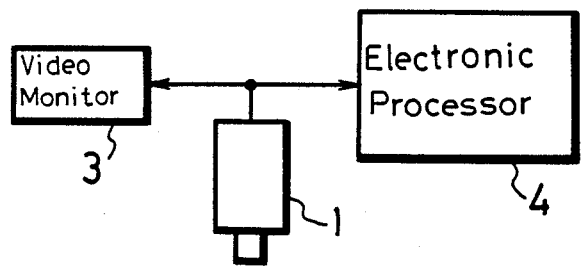
FIG. 1 is a block diagram showing an embodiment of the object external shape inspection apparatus according to the present invention.
Figure 1:

FIG. 1 shows the entire arrangement of one embodiment of the apparatus according to the present invention. In FIG. 1, a video camera 1 used as a photoelectric conversion sensor detects an object 2 to be inspected which is irradiated properly by a light source so that the reflected optical image therefrom is picked up by the video camera 1. A video monitor 3 is provided to allow the visual confirmation of the image of the inspected object 2 as photosensed by the video camera 1, for instance, whether the position of the same is right or not. Further, the electrical video signal from the video camera 1 is also sent to an electronic processor 4, in which the condition of the inspected object 2 is judged.

The present invention is particularly adapted to an inspection method and apparatus that is limited to the inspection of the external shape of the objects where the external shape or appearance of the object is symmetrical with respect to a certain line or point. Among processed components, parts, products and so on, there are many goods that possess such symmetricity. Thus, the present invention has sufficient practical value. For those goods that have no symmetricity as a whole, it is needless to say that inspection can be confined to the portions of the goods with symmetricity therein.

Figure 2:
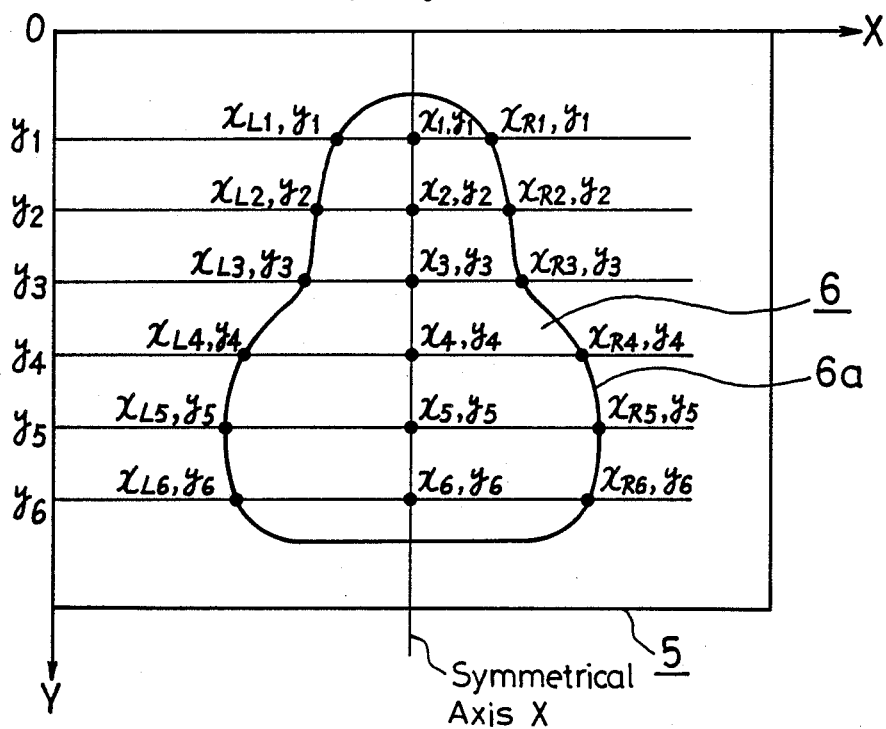
FIGS. 2 and 4 are schematic diagrams that are respectively used to explain the basic theory of the method according to the present invention.

The basic concept of the inspection method of the present invention is explained with reference to FIG. 2 in which picture screen 5 of the video monitor 3 is shown. The video screen 5 coincides with the target screen of the video camera 1—that is, the photoelectric conversion screen of the video camera 1, so that the image 6 of the inspected object 2 is reproduced on the video screen 5. The object 2 is displayed in a manner whereby the symmetrical axis 0 of the inspected object 2 generally coincides with the vertical direction of the picture screen 5. The picture screen 5 is defined by an orthogonal grid of horizontal and vertical coordinate axes—namely, XY coordinate as shown on FIG. 2, so that the axes are parallel to the vertical. When a plurality of axes, parallel to the x coordinate, passing respectively through points y1, y2, ... y6, (limited to six for illustration) are respectively set on the symmetrical axis 0 with a proper uniform distance between adjacent points from the top downwards, the coordinates of the particular points on each side of the symmetrical axis 0 on each of the y axes, cross the external or peripheral contour 6a of the image 6 of the inspected object 2 at coordinates indicated as (xL1, y1), xR1, y1); (xL2, y2), (xR2, y2); ... (xL6, y6), (xR6, y6).

In fact, the scanning of the video camera 1 is such that the horizontal scanning (X axis direction) is sequentially moved in the vertical direction (Y axis direction) so that the above points are caught on the horizontal scanning lines.

In sensing a truly symmetrical object the midpoint between each of the right and left points (xL1, y1), (xR1, y1); (xL6, y6), (xR6, y6) (½(xL1, y1+xR1, y1), ½(xL2, y2+xR2, y2) ... ½(xL6, y6+xR6, y6), can be defined as the coordinate (x1, y1), (x2, y2) ... (x6, y6) and the line that couples the points (x1, y1) ... (x6, y6) is the center division line of the optical image 6—that is, the symmetrical axis 0.

Figure 3:
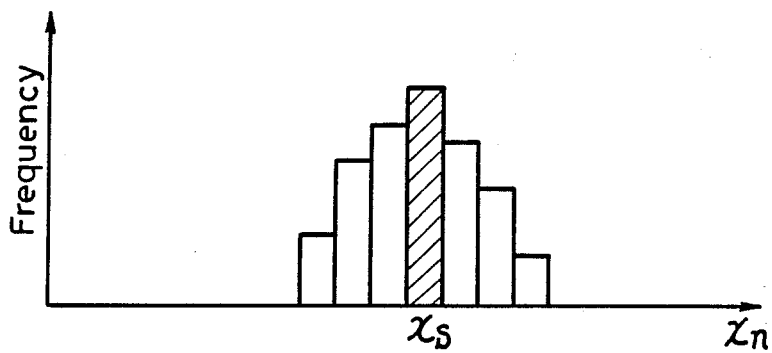
FIG. 3 is a histogram used to explain the present invention.

In sensing an object which, however, has a symmetrical image 6 with respect to the axis 0 that has a slight distortion in the strict sense, a histogram in relation to the coordinates (x1), ... (x6) of the above-mentioned center points is first made as shown in FIG. 3. From this histogram, the value of the most frequent value of the x coordinate is found, and then that value is taken as the coordinate of the center points xs on the X axis. Then, the line passing through the point (xs) and parallel to the Y axis is taken as the standard center division or axis of symmetry of the optical image 6.

Here, if the coordinates of the right and left points of the object 2, which right and left points make pairs with respect to the symmetrical axis 0 are generally expressed by using n (y1, 2, 3, ... ), $$(xLn, yn) \tag{1}$$

(xRn, yn) are obtained.

Accordingly, the coordinate (xn, yn), the center point between the above-mentioned pair points, can be expressed by the following:

$$\tfrac{1}{2}(xLn, yn+xRn, yn)=xn, yn \tag{2}$$

Therefore, the X coordinate (xn) of the above center point can be expressed by the following:

$$\tfrac{1}{2}(xLn+xRn)=xn \tag{3}$$

Here, if the image 6 is of a symmetrical shape with respect to the symmetrical axis 0, the following can be established for all of the n).

$$xn=xs \tag{4}$$

Figure 4:
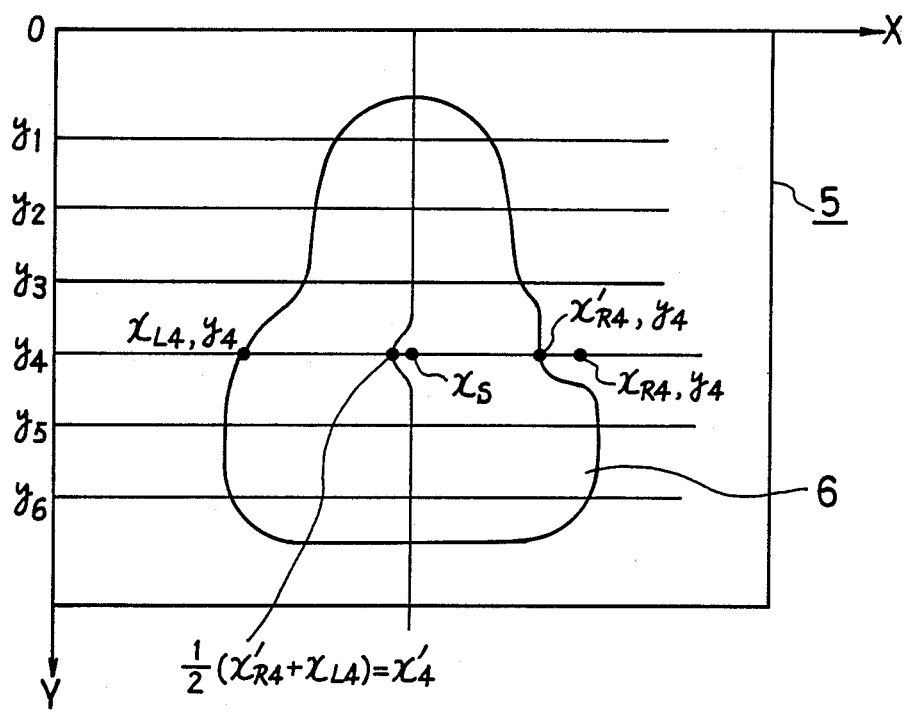

On the other hand, as shown on FIG. 4, if there is a portion that shows a destruction in the symmetric shape near the point such as (x'4, y4) in image 6 (where xR4>x'R4), then the center or midpoint becomes, $$x'4) = \tfrac{1}{2}(xL4 + x'R4) \neq xs \quad (5)$$

Therefore, it can be seen that the inspected object 2 is not a good product.

Thus, in switching sequential from x0 -xn in the above relation (4), it can be determined whether the midpoint is valid or not for each n, and the symmetricity of the image 6, i.e. the inspected object 2 can be checked over all of the object 2. Needless to say, if the number of n is increased to make fine sequential judgements, even subtle changes may be detected.

Since the standard center division line that passes through the point (xs) is set after measuring each of the above-mentioned center points (xn) of the entire image 6 and making the length of the histogram as long as the entire image 6 within the picture screen 5 then as long as the symmetrical axis 0 of the image 6 is parallel to the Y axis, the position of image 6 may be at any place on the picture screen 5. Even if the shape of image 6 changes, the measurement method can be the same, and it is not necessary to make any changes. Further, if a little amount of tolerance (+) is given to the value of point (xs), the scattering in shapes of a large number of inspected images may be absorbed without the need for adjustment of the system.

Figure 5:
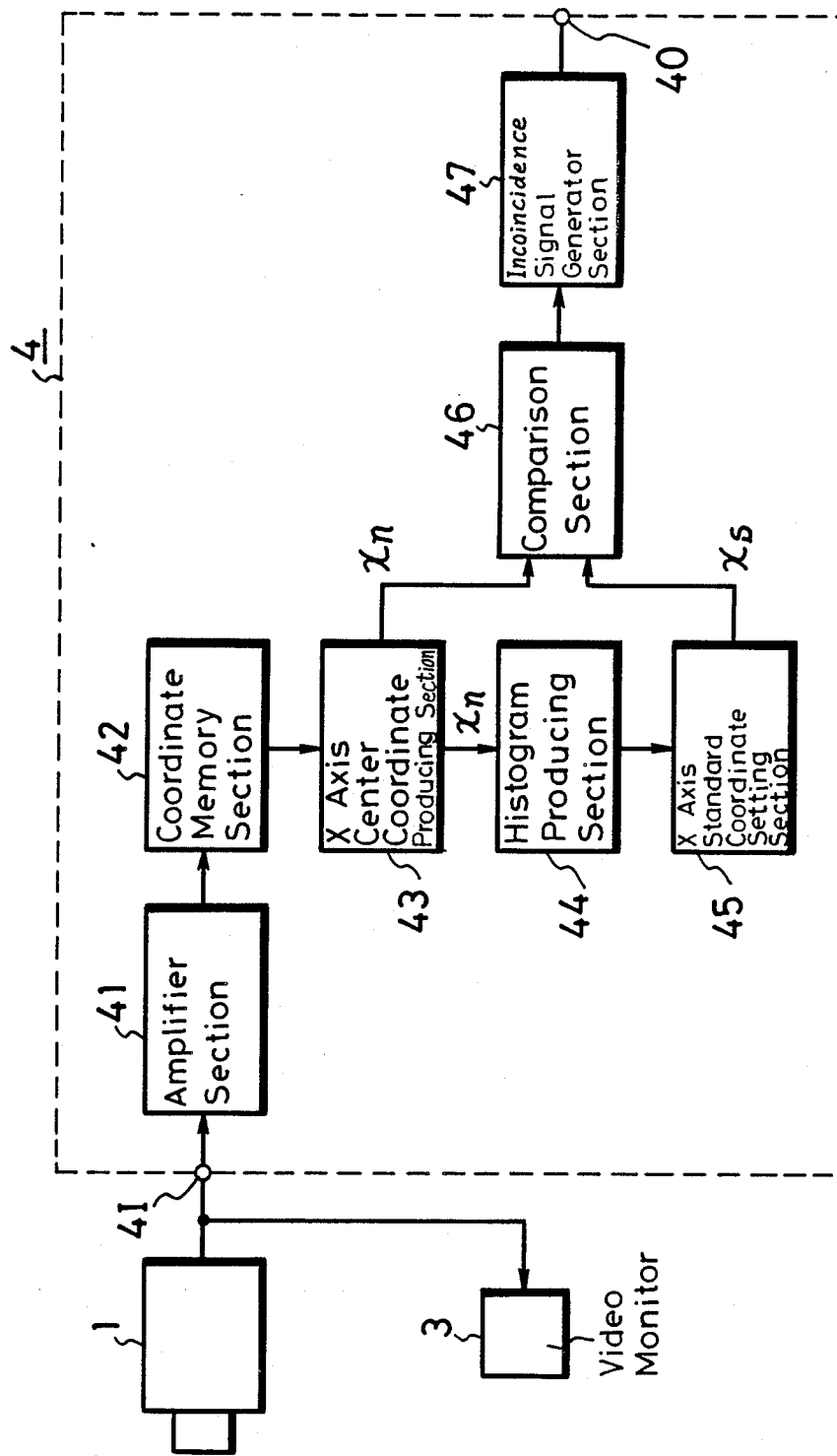
FIGS. 5 and 6 are block diagrams each showing an example of the electronic processor that is used in the embodiment of the present invention as shown in FIG. 1.

FIG. 5 is a block diagram showing a practical example of the electronic processor 4 for carrying out the above-mentioned inspection methods. The inspection apparatus will be explained with reference to FIG. 5. The video signal of the inspected object 2 from the video camera 1 is supplied through an input terminal 41 of the electronic processor 4 to its amplifier 41 section and then amplified. Depending upon the case, it may be possible that the amplifier section 41 includes a contour extracting circuit which removes i.e. filters undesired components from the video signal or only allows the signal corresponding to the external shape of the image 6. The signal which is preprocessed by the amplifier section 41 is supplied to a coordinate memory section 42. This coordinate memory section 42 only memorizes the coordinates (xLn, yn) and (xRn, yn) which are points on the external contour of image 6 that are on the same line passing through point (yn) of the Y axis. Next, from the memorized coordinates (xLn, yn) and (xRn, yn) in the memory section 42, the center coordinate (xn) related to the X axis between the two points (xLn, yn) and (xRn, yn) is obtained in accordance to relation (3) by an X axis center coordinate producing section 43. This center coordinate (xn) is obtained by simply determining the midpoint by doing the ½(xRn+xLn) while sequentially changing the n in sequence. These center coordinates (xn) are sent in sequence in a histogram producing section 44 at which the coordinates (xn) are segregated into related blocks and the histogram as shown in FIG. 3 in relation with the X axis is made. Next, an X axis standard coordinate setting section 45 searches the X axis coordinate of the most frequent block in the histogram from the producing section 44, and this X axis coordinate is made as the standard center coordinate (xs) of the X axis.

Then, this standard coordinate (xs) is compared in comparison section 46 with each of the values of the corresponding coordinates (xs) produced in the X axis center coordinate producing section 43 derived from each line y1—yn. Needless to say, the X axis center coordinate producing section 43 not only produces the center coordinate (xn but also provides the memory function to hold the sequence of coordinate (xn) produced until they are compared with the coordinate (xn) at the comparison section 46. The compared result by the comparison section 46 is supplied to an incoincidence signal generator section 47. The generator section 47 produces an incoincidence signal and delivers the same to the outside through an output terminal 40 when the coordinates (xn) and (xs) are incoincident so as to alternate an alarm and/or rejection system or the like (not shown).

From such above functions, whenever there are abnormalities that do not form symmetricity in the external contour on the image 6 of the inspected object 2, the above incoincidence signal is generated to indicate the inspection results.

The mentioned circuitries may be contained within a simple software for use on a computer such as the conventional microcomputer, or rather it is obvious that they may easily include hardware such as a memory, clock generator, counter, and comparator, etc.

Further, although the above is the case where (xn) and (xs) are compared, it is possible that the external contour of the inspected object 2 may also be inspected by such a manner that (xs—xLn) and (xRn—xs) are obtained—that is, the distances from the standard symmetrical axis that passes through the point (xs) of the inspected object 2, to the left and right external contours are obtained, and then both the distances are compared. Such above case will be explained in reference with FIG. 6.

Figure 6:
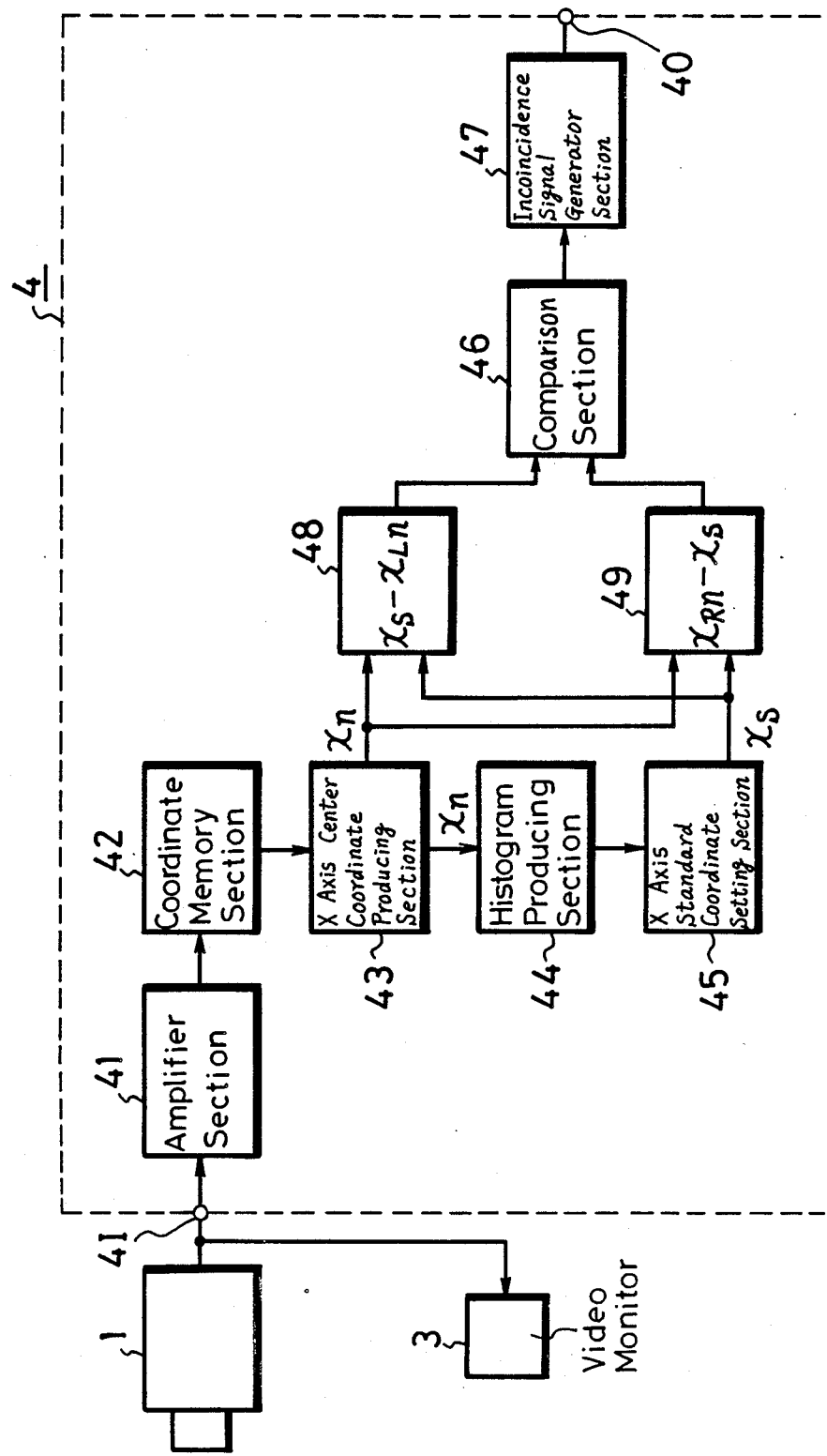

In FIG. 6 the same references as those used in FIG. 5 show the same elements so that their detailed explanations will not be repeated. Now, in the the example shown on FIG. 6, the center coordinate (xn) as determined by the X axis center coordinate producing section 43 and the standard center point coordinate (xs) as determined by the X axis standard coordinate producing section 45 are both supplied to first and second distant producing sections 48 and 49, respectively. The first distance producing section 48 calculates (xs—xLn), while the second distance producing section 49 calculates ($x^R$n—xs). Such calculation results are, similar to the case shown on FIG. 5, compared at the comparison section 46. Then the compared result is sent to the incoincidence signal generator section 47 and then processed. Thus, the example of FIG. 6 can carry out the external contour of the inspected object 2 similarly to the example on FIG. 5.

In addition, without departing from the scope of the novel concepts of the present invention, it is apparent that those skilled in the art may provide many variations and changes so that the scope of the invention should be determined by the appended claims only.

I claim as my invention:

1. A method for inspecting objects having a shape symmetrical along at least one axis, comprising the steps of photoelectrically producing an image of said object on a picture screen having a plurality of orthogonal x and y coordinate axes such that said at least one symmetrical axis of said image is arranged parallel to one of said x and y axes;

scanning said picture screen for the right and left coordinate positions on opposite sides of said symmetrical axis corresponding to the point of intersection of the external contour of said image with each of a plurality of straight lines perpendicular to said symmetrical axis and for; the midpoint position between each of the opposite right and left coordinate positions in each of said perpendicular lines and obtaining a signal indicative of each of said points;

determining the frequency of the signals of substantially identical midpoint positions and obtaining a standard center coordinate signal corresponding to the most frequent midpoint position; and, thereafter, comparing each of the signals of said midpoint positions of each of said perpendicular lines sequentially with the standard center coordinate.

2. The method according to claim 1 including the step of generating a signal in response to the result from said comparing step.

3. The method according to claim 1 including the steps of measuring a first distance between said standard center coordinate and the left coordinate position in each of said perpendicular lines; and measuring a second distance between said standard center coordinate point and the right coordinate position in each of said perpendicular lines; and thereafter comparing the respective first and second distances in each of said perpendicular lines.

4. The method according to claim 3 including the step of generating signal in response to the result from said comparing step.

5. Apparatus for inspecting the external shape of an object having an axis of symmetry comprising:

first means having a photoelectric conversion screen expressed in an X and Y coordinate grid for sensing the shape of said object and displaying an image of said shape such that the symmetrical axis of said object is parallel to one axis of the X and Y coordinate and for producing a video signal thereof;

second means, responsive to said video signal, for obtaining, in each of a plurality of straight lines perpendicular to said symmetrical axis, a signal indicative of the right and left coordinate points at which the external contour of said object intersects each of said lines perpendicular to said symmetrical axis;

third means for determining the signal of the midpoint between each of said right and left coordinate points in each of said lines perpendicular to said symmetrical axis;

fourth means for determining the frequency of identical midpoints for all of said perpendicular lines and for creating a standard center coordinate having the maximum number of identical signals of the midpoint;

fifth means for comparing the signal of said standard center coordinate with the signal of midpoint of each of said lines perpendicular to said symmetrical axis; and sixth means for obtaining a signal indicative of the symmetry of said object in response to the incidence of said midpoint and said standard center axis.

6. The apparatus according to claim 5 further comprising a seventh means for generating a signal in response to said sixth means.

7. The according to claim 5 further comprising an eighth means for ascertaining whether or not said object is sensed by said first means at a correct position.

8. Apparatus for inspecting the external shape of an object having an axis of symmetry comprising:

first means having a photoelectric conversion screen expressed in an XY coordinate grid for sensing the shape of said object and displaying said shape such that the symmetrical axis of said object is parallel to one axis of the XY coordinate and for producing a video signal thereof, second means responsive to said video signal for determining the coordinates of the grid at a plurality of right and left points with respect to the other axis of the XY coordinate at which an external contour of said object intersects each of a plurality of straight lines perpendicular to said symmetrical axis;

third means for determining the midpoint between each of said right and left points in each of said lines perpendicular to said symmetrical axis;

fourth means for determining the frequency of identical midpoints for all of said perpendicular lines and for creating a standard center coordinate having the maximum number of identical midpoint;

fifth means for determining the midpoint first distance between said standard center coordinate and each of said left points in each of the lines perpendicular to said symmetrical axis;

sixth means for determining the second distance between said standard center coordinate and the right point in each of the lines perpendicular to said symmetrical axis; and seventh for comparing said first and second distances and detecting the symmetry of said object in response to the incidence of said distance.

9. The apparatus according to claim 8 further comprising an eighth means for generating a signal in response to said seventh means.

10. The apparatus according to claim 8 further comprising a ninth means for ascertaining whether or not said object is sensed by said first means at a correct position.

* * * * *